Patented Nov. 13, 1945

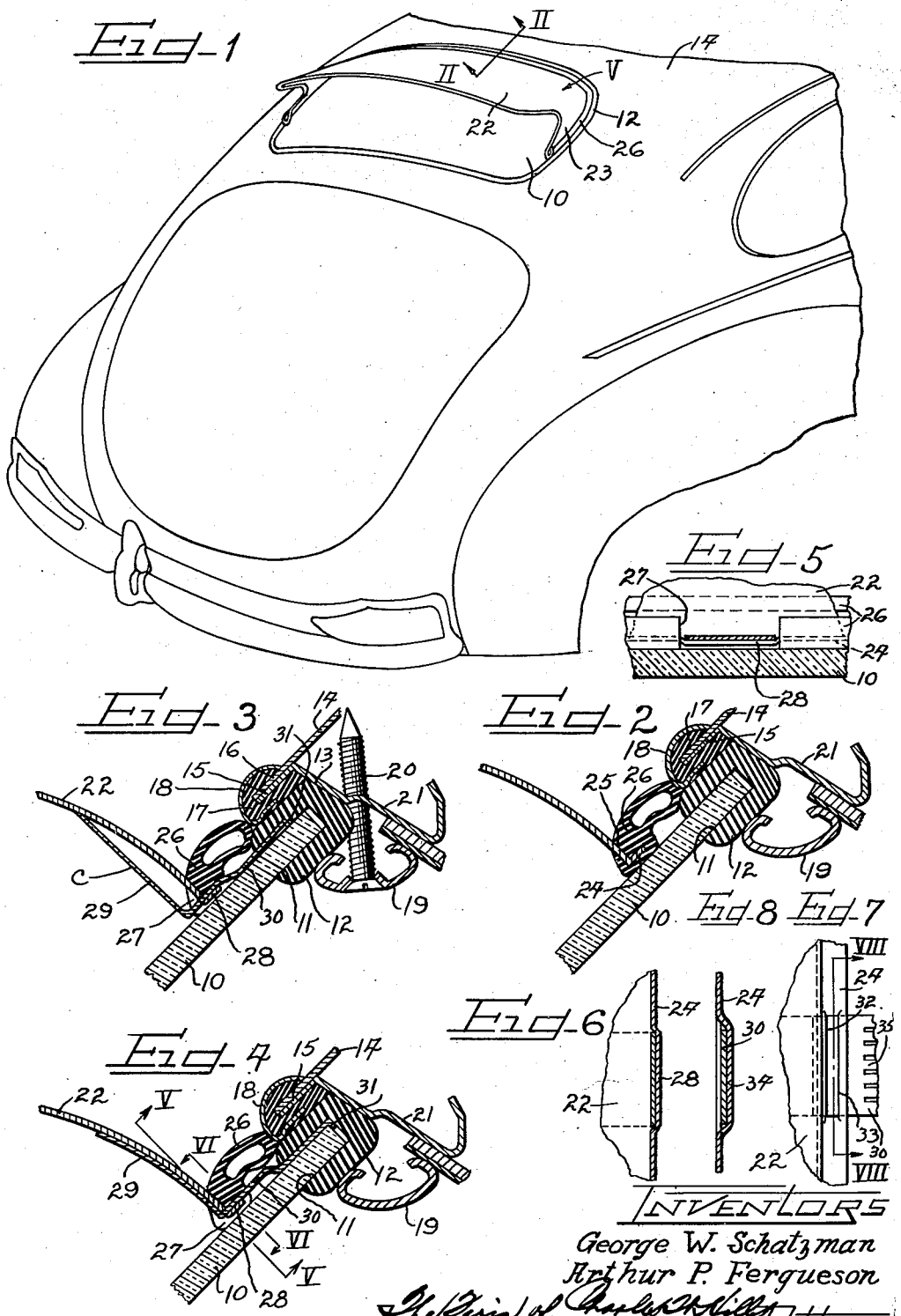

2,389,002

UNITED STATES PATENT OFFICE 2,389,002

AUTOMOBILE WINDOW VISOR

George W. Schatzman and Arthur P. Fergueson, Detroit, Mich., assignors to Houdaille-Hershey Corporation, Detroit, Mich., a corporation of Michigan Application December 16, 1944, Serial No. 568,442

8 Claims. (Cl. 296—95)

This invention relates to automobile window visors or shields adapted particularly for application to the rear windows of cars in the sloping roof thereof, the visors functioning to prevent precipitation of rain or snow on the window pane so that the driver may have full visibility range therethrough.

In general, the object of the invention is to provide improved means and arrangement for readily attaching the visor in service position and for holding it in such position against accidental displacement or unlawful removal thereof.

An important object of the invention is to provide a visor having a sealing strip, preferably of rubber, secured to and along its mounting edge for engagement with the pane and cooperation with the supporting and sealing sash for the pane, together with spring metal securing clip members for insertion between the pane and its supporting sash and for hooking around the edge of the pane to thus hold the visor with its sealing strip intimately against the pane and against the window sash with sealing fit.

On the accompanying drawing which shows our improved visor and securing means therefor, Figure 1 shows in perspective the rear portion of an automobile having a sloping roof with a window therein to which our improved visor is applied;

Figure 2 is an enlarged section on plane II—II of Figure 1 showing the setting of the visor with its sealing strip applied ready for application of the holding clips;

Figure 3 is a section similar to Figure 2 showing the spring clamps or clips being applied;

Figure 4 is a similar section showing the clamps or clips in service position;

Figure 5 is a section on plane V—V, Figure 4;

Figure 6 is a section on plane VI—VI, Figure 4;

Figure 7 shows a modified arrangement for engagement of the clips with the visor body; and Figure 8 is a section on plane VIII—VIII, Figure 7.

The window pane 10 is surrounded by and received at its edges in the recess 11 of a sash 12 which is preferably of rubber or rubber-like material. As best shown on Figure 3, the sash 12 is within an opening 13 in the sloping wall 14 of the automobile roof. This opening 13 is overhung and surrounded by a flange 15 which is received in the slit 16 of a sealing strip 17, preferably of rubber, this strip being covered on its top and outer side by a metal sheath 18. The window sash 12 is held against the inner side of the sealing strip 17 as by means of a metal ring or moulding 19 held by suitable means, such as drive screws 20, against the sash 12 and the frame 21 depending from the roof and providing the opening 13.

The visor V comprises a top wall portion 22 and side wall portions 23. The top wall and side wall portions are deflected at their ends to form a surrounding peripheral flange 24, this flange and a portion of the top and side walls thereabove being received in the slit 25 of a sealing strip 26 which, when the visor is in service, seats against the pane 10 and against the window sash 12 and the sealing strip 17, the sealing strip 26 outwardly of its pane engaging base being preferably hollow, as shown, in order to be more flexible.

As shown on Figures 3, 4 and 5, the sealing strip 26 is cut away at intervals to leave transverse passages or clearance spaces 27 for the application of clips C for holding the visor in place. In alignment with these spaces the visor flange 24 is cut or slitted at its junction with the body wall of the visor and the portions 28 of the flange outwardly of the slits are depressed to provide seats for the clip or clamping members C. As shown, these clips are in the form of plates of thin spring sheet metal bent intermediate their ends to form the outer legs 29 for engagement against the inner side of the visor walls, and the legs 30 for insertion through the spaces 27 of the sealing strip 26 over and along the depressed portions 28 of the flange 24, the end of legs 30 being deflected to form hooks 31. When the visor is to be applied, the legs 30 of the clips are inserted through the spaces 27 and are moved along the top of the pane and forced into the recess 11 of the window sash 12 and when the clips are pushed in the full distance, the hook ends 31 will snap around the edge of the pane as shown on Figure 4, the other legs 29 of the clips being then in pressure engagement with the inner side of the visor body, the visor body being then securely attached. During such attachment of the visor, the sealing strip 26 thereon will be pressed into sealing engagement with the window sash and the surrounding sealing strip 17, and the base of the strip 26 will be securely held against the window pane. When the visor has been thus attached into service position it will be practically impossible to detach it without seriously bending or destroying it, unless special tools are used for lifting the hook ends of the clips out of their engagement with the edge of the window pane.

Instead of depressing portions of the visor flange 24 the full width of the flange, only narrow longitudinal portions may be deflected downwardly, as shown on Figures 7 and 8. At intervals the flange is slitted along parallel lines 32 and 33 and the portions 34 between the slits are depressed into a plane below the plane of the flange so that the legs 30 of the clips may be inserted between the flange and the depressed portions 34. As shown on Figure 7, the ends of the clip legs 30 may be slitted longitudinally to leave spring fingers 35 terminating in hooked ends for engagement around the edge of the window pane.

We have thus produced a simple and efficient visor assembly and means for readily securing it to the windows of automobiles. We do not however desire to be limited to the exact construction and arrangement shown and described as changes and modifications may be made without departing from the scope of the invention.

We claim as our invention:

1. A visor assembly for a window of an automobile in which the window pane is received in a sash of rubber-like material, comprising a visor body having spaced apart openings therethrough adjacent to and along its peripheral edge, and angular shaped clips of comparatively thin spring sheet metal with one leg thereof engageable with the inner side of the visor body and the other leg thereof insertable through said openings and between the window sash and the pane and terminating in hook ends for engagement around the edge of the pane.

2. A visor assembly for the window of an automobile in which the window pane is received along its edge portion in a sash of rubber-like material, comprising a visor body of sheet material having spaced apart openings therethrough adjacent to and along its peripheral pane engaging edge, securing clips of thin spring sheet metal insertable through said openings and between the window pane and the sash and terminating in hook ends for engaging around the edge of the pane, said clips having upwardly extending outer ends for engagement against the inner side of the visor body whereby when said hook ends engage with the window pane the visor will be held in service position.

3. A visor assembly for attachment to the window of an automobile in which the window pane is received in a sash of yieldable elastic material, comprising a visor body of sheet material having a forwardly extending flange around its periphery, a sealing strip receiving and anchored to said flange for sealing engagement with the window pane and the sash, said sealing strip being cut away at intervals along its outer and bottom sides to provide transverse clearance spaces, said flange having openings therethrough in alignment with said clearance spaces, securing clips of spring sheet metal insertable through said clearance spaces and the aligned openings in said flange for insertion between the top of the pane and the sash and said clips terminating in hook ends for engagement around the edge of the pane, said clips at their outer ends being deflected for engagement with the visor body whereby, when said clip hook ends are brought into engagement around the edge of the pane, the visor body will be held in service position with the sealing strip thereon in intimate engagement with the pane and with the sash.

4. A visor assembly for an automobile window in which the pane is received in a sash of rubber-like material, comprising a visor body having a peripheral seating flange extending therefrom, portions of said flange being deflected out of the plane thereof to provide transverse passageways, and securing clips extending through said passageways for insertion between the pane and the sash and terminating in hook ends for engagement around the edge of the pane.

5. A visor structure for application to an automobile window in which the pane is received in a sash of rubber-like material, comprising a body for seating against the pane and provided with transverse passageways adjacent to and along its seating edge, and clips having an end wall and a base wall, said base walls being insertable through said openings and between the window pane and the sash and terminating in hook ends for engaging around the edge of the pane, the end walls of said clips engaging with the visor body to hold the visor in place.

6. A visor structure for an automobile window in which the pane is received in a sash of elastic yieldable material, comprising a body of sheet material whose peripheral portion is deflected to provide a seating flange, longitudinal portions of said flange being deflected downwardly to provide transverse passageways, securing clips of thin spring metal having outer end walls and at their inner ends being deflected to form hooks, said clips being insertable through said passageways for passage of their hook ends between the window pane and the sash and engagement of the hooks around the pane edge, the end walls of said clips engaging against the visor body when the hook ends engage the pane edge whereby the visor structure will be held in service position.

7. A visor assembly for an automobile window in which the window pane is received in a sash of yieldable material, comprising a visor body for seating along its periphery on the window pane in alignment with the sash, and spring clips connected at their inner ends with said body to project therefrom and terminating in hooks, the outer ends of said clips being insertable between the window pane and the sash for engagement of the hooks around the edge of the pane to thereby support the visor assembly in service position.

8. A visor assembly for an automobile window in which the window pane is received in a sash of yieldable material, comprising a visor body for seating along its periphery on the window pane in alignment with the sash, and spring clips connected at their inner ends with said body to project therefrom and terminating in hooks, the outer ends of said clips being insertable between the window pane and the sash for engagement of the hooks around the edge of the pane to thereby support the visor assembly in service position, said visor body having a sealing strip secured thereto along its periphery for sealing engagement with the window pane and the sash when the visor body is to be secured in service position.

GEORGE W. SCHATZMAN.
ARTHUR P. FERGUESON.